United States Patent Office 3,278,609
Patented Oct. 11, 1966

3,278,609
ALKINE DIOLS AND PROCESSES OF PREPARATION
Herbert Köppe and Karl Zeile, Ingelheim (Rhine), Germany, assignors to Boehringer Ingelheim Gesellschaft mit beschrankter Haftung, Ingelheim (Rhine), Germany, a corporation of Germany
No Drawing. Filed Mar. 26, 1963, Ser. No. 267,916
Claims priority, application Germany, Aug. 19, 1960, B 59,043
6 Claims. (Cl. 260—618)

This is a continuation-in-part of copending application Serial No. 207,028, filed July 2, 1962, now abandoned, which in turn is a continuation-in-part of application Serial No. 131,467, filed August 15, 1961, now abandoned.

This invention relates to novel alkine diols comprising one secondary and one tertiary carbinol group and to processes for their preparation.

More particularly, the present invention relates to novel alkine diols of a formula selected from the group consisting of

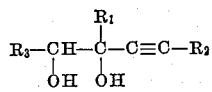
(I)

and

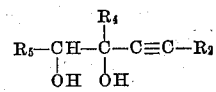
(Ia)

wherein $R_1$ is a substituent of 1 to 12 carbon atoms selected from the group consisting of alkyl, alkenyl, alkinyl, carbocyclic aryl-alkyl, cycloalkyl and carbocyclic aryl, $R_2$ is selected from the group consisting of hydrogen, lower alkyl and halogen, $R_3$ is selected from the group consisting of methyl and carbocyclic aryl-alkyl of 1 to 8 carbon atoms, $R_4$ is a substituent of 1 to 12 carbon atoms selected from the group consisting of alkyl, alkenyl, alkinyl, carbocyclic aryl-alkyl and cycloalkyl, and $R_5$ is a substituent of 1 to 8 carbon atoms selected from the group consisting of methyl, carbocyclic aryl-alkyl and carbocyclic aryl.

Within the last few years the chemical group of unsaturated nitrogen-free diols has acquired considerable importance as tranquilizing and sleep-inducing agents, since a demand has developed for weaker pharmaceuticals free from habit-forming barbituric acid and barbiturates.

Among these unsaturated nitrogen-free diols are the alkine diols. While a number of alkine diols have been produced, they have the drawback of containing two adjacent tertiary carbinol groups which give rise to a rather unpleasant aromatic, burnt taste when taken orally.

It is an object of the present invention to obtain alkine diols having one secondary and one tertiary carbinol group, and an excellent sedative action.

It is a further object of the invention to obtain alkine diols of a formula selected from the group consisting of

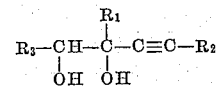
(I)

and

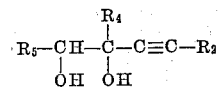
(Ia)

wherein $R_1$ through $R_5$ have the meanings defined above.

Another object is to develop a process of obtaining said alkine diols.

These and other objects of the invention will become more apparent as the description thereof proceeds.

We have made the discovery that certain alkine diols having only one tertiary carbinol group are devoid or almost devoid of an unpleasant taste and are excellent sedatives for oral administration.

These novel alkine diols have a formula selected from the group consisting of

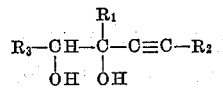

and

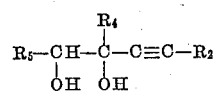

wherein $R_1$, $R_2$, $R_3$, $R_4$ and $R_5$ have the meanings defined above.

The compounds of the above formulas can be divided into two series, one where $R_2$ is either hydrogen or lower alkyl and the second where $R_2$ is a halogen. Among the alkine diols we prefer compounds having the structural formulas

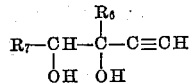

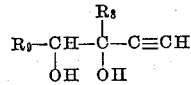

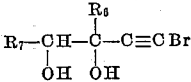

and

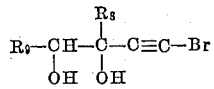

wherein $R_6$ is a radical of 1 to 8 carbon atoms selected from the group consisting of alkyl, cycloalkyl, phenyl and halophenyl, $R_7$ is methyl, $R_8$ is a radical of 1 to 8 carbon atoms selected from the group consisting of alkyl and cycloalkyl, and $R_9$ is a radical of 1 to 6 carbon atoms selected from the group consisting of methyl, phenyl and halophenyl.

Especially preferred are alkine diols of a formula selected from the group consisting of

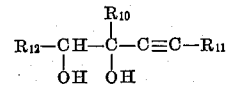

and

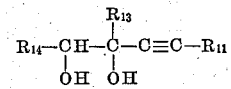

wherein $R_{10}$ is a radical selected from the group consisting of alkyl of 1 to 4 carbon atoms, phenyl and p-chlorophenyl, $R_{11}$ is a member of the group consisting of hydrogen and bromine, $R_{12}$ is methyl, $R_{13}$ is a radical selected from the group consisting of alkyl of 1 to 4 carbon atoms and $R_{14}$ is a radical selected from the group consisting of methyl, phenyl and p-chlorophenyl.

In accordance with the present invention, compounds of formulas I and Ia may be prepared by the following process in its several alternative procedures. Primarily this process involves the reaction of an α-hydroxy ketone of a formula selected from the group consisting of

and

wherein the radicals $R_1$, $R_3$, $R_4$ and $R_5$ have the above indicated meanings, with an alkine derivative of the general formula $$R_{16}-C\equiv C-X \qquad (III)$$

wherein $R_{16}$ is selected from the group consisting of hydrogen and lower alkyl, and X is either a metal atom or the Grignard radical, —MgHal, wherein Hal represents a halogen atom.

In the event that $R_{16}$ represents a hydrogen atom, it may, if desired, subsequently be replaced by a halogen atom in accordance with known methods.

The reaction proceeds in accordance with the following reaction formula, wherein the substituents $R_1$, $R_3$, $R_{16}$ and X have the above indicated meanings:

In the following are given particularly advantageous embodiments of the process according to the invention.

If the reaction is carried out with metal compounds of the alkine, an alkali metal is preferably dissolved in liquid ammonia, accompanied by simultaneous addition of the alkine. The further reaction of the metal compounds of the alkines with the α-hydroxy ketones may be carried out at temperatures below —35° C. in liquid ammonia or, after evaporation of the ammonia and addition of an inert organic solvent, at temperatures between about 0 and 130° C. Examples of suitable solvents are benzene, toluene, xylene, dimethylformamide, etc. The metal compounds of the substances having the Formulas I and Ia, which are thus obtained, are subsequently transformed into the corresponding alkine diols of Formulas I and Ia by treatment with dilute acids or ammonium chloride.

If the Grignard compounds of Formula III are reacted with the α-hydroxy ketones of the Formulas II and IIa above, the following embodiment of the process has proved to be advantageous. The Grignard compound of the alkine is prepared by known methods in an inert organic solvent, preferably tetrahydrofuran. Subsequently, the α-hydroxy ketone is added at temperatures between about —20 and +50° C., the ratio of reactants being at least 2 mols of the Grignard compound per mol of α-hydroxy ketone. The reaction is preferably carried out in an atmosphere of nitrogen. After the reaction has gone to completion, the reaction mixture is decomposed with ammonium chloride or dilute acids, accompanied by cooling, and the desired product is isolated from the organic phase.

In the event that substituent $R_2$ is a hydrogen atom, this acid hydrogen atom may, if desired, be replaced by halogen in the end product. For this purpose, the alkine compound is treated, in accordance with known methods, with a solution of an alkali metal hypohalite at temperatures between —10 and +30° C. The haloalkine diols formed thereby separate out of the aqueous phase in the form of a liquid or solid and may be isolated by customary methods.

Some of the α-hydroxy ketones used as starting compounds in the present process are also novel. They may, for example, be prepared in accordance with customary methods by means of a Grignard reaction with α-hydroxy carboxylic acid derivatives, as represented by the following reaction formula:

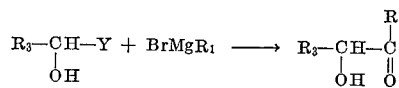

In this formula Y represents a carbonamide group or a nitrile group and the substituents $R_1$ and $R_3$ have the meanings previously defined.

For the preparation of compounds of Formula II above, wherein $R_1$ is an alkyl or carbocyclic arylalkyl radical, it is also possible to subject metal compounds of alkines to an addition reaction with aldehyde and subsequently with water in accordance with known methods, as represented by the following reaction formula:

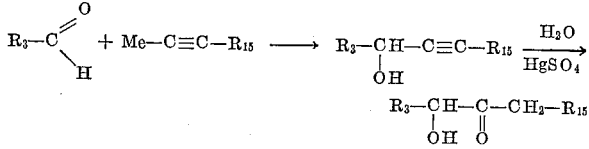

In this reaction formula $R_3$ has the above indicated meaning, Me represents a metal atom and $R_{15}$ is selected from the group consisting of a hydrogen atom, an alkyl radical and a carbocyclic aryl radical, the radical —$CH_2$ —$R_{15}$ forming the radical designated as $R_1$ in Formula I.

The compounds prepared in accordance with the present invention are useful pharmaceuticals which are especially characterized by their sedative activities. At high dosages they also exhibit good hypnotic activities as well as narcotic activities. They are also characterized by their particularly low toxicity.

The following examples further illustrate the process according to the present invention and enable others skilled in the art to understood it more completely. It will be understood, however, that the invention is not limited to these particular embodiments.

*Example 1.—Preparation of 3-phenyl-penthe-(1)-3,4-diol*

11.5 gm. (0.5 mol) of sodium were introduced into 450 cc. of liquid ammonia. The sodium dissolved and the solution turned blue. At the same time a vigorous stream of acetylene is passed through the ammonia solution until the solution becomes colorless. Thereafter, a solution of 30 gm. (0.2 mol) of α-hydroxy propiophenone (Formula II, $R_1=C_6H_5$, $R_3=CH_3$) in 60 cc. of ether (absolute), accompanied by thorough cooling (internal temperature —40° C.) and vigorous stirring. The introduction of a gentle stream of acetylene was maintained. After removal of the cooling bath, the introduction of acetylene was continued and the solution was stirred until all of the ammonia had evaporated. The residue was covered with a layer of ether, and then ice was carefully introduced and the mixture was neutralized with hydrochloric acid (diluted in a ratio of 1:1). The ether phase was separated, the aqueous phase was shaken twice with ether, the ether extract solutions were combined and washed with dilute sulfuric acid and a sodium bircarbonate solution, dried over magnesium sulfate and distilled in vacuo.

3-phenyl-pentine-(1)-3,4-diol (Formula I, $R_1=C H_5$, $R_2=H$, $R_3=CH_3$) was obtained as a liquid residue.
B.P. at 0.06 mm./Hg: 88–90° C.
Yield: 32 gm. (91% of theory).

*Example 2.—Preparation of 3-methyl-pentine-(1)-3,4-diol*

Using the same procedure as described in Example 1, 3-methyl-pentine-(1)-3,4-diol of the formula

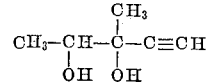

having a boiling point of 46° C. at 0.25 mm./Hg was prepared from acetoin and acetylene.

*Example 3.—Preparation of 3-ethyl-pentine-(1)-3,4-diol*

Using the same procedure as described in Example 1, 3-ethyl-pentine-(1)-3,4-diol of the formula

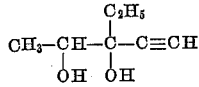

having a boiling point of 57–58° C. at 0.5 mm./Hg was prepared from 2-hydroxy-3-pentanone and acetylene.

*Example 4.—Preparation of 3-n-propyl-pentine-(1)-3,4-diol*

Using the same procedure as described in Example 1, 3-n-propyl-pentine-(1)-3,4-diol of the formula

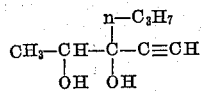

having a boiling point of 56–58° C. at 0.06 mm./Hg was prepared from 2-hydroxy-3-hexanone and acetylene.

*Example 5.—Preparation of 3-isopropyl-pentine-(1)-3,4-diol*

Using the same procedure as described in Example 1, 3-isopropyl-pentine-(1)-3,4-diol of the formula

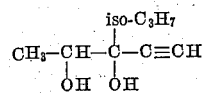

having a melting point of 68–71° C. was prepared from 4-methyl-2-hydroxy-3-pentanone and acetylene.

The product was obtained as a crystalline residue.

*Example 6.—Preparation of 3-n-butyl-pentine-(1)-3,4-diol*

Using the same procedure as described in Example 1, 3-n-butyl-pentine-(1)-3,4-diol of the formula

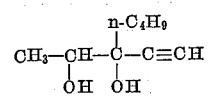

having a boiling point of 68–69° C. at 0.04 mm./Hg was prepared from 2-hydroxy-3-heptanone and acetylene.

*Example 7.—Preparation of 3-n-hexyl-pentine-(1)-3,4-diol*

Using the same procedure as described in Example 1, 3-n-hexyl-pentine-(1)-3,4-diol of the formula

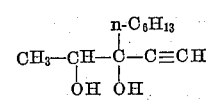

having a boiling point of 86–87° C. at 0.02 mm./Hg was prepared from 2-hydroxy-3-nonanone and acetylene.

*Example 8.—Preparation of 3-n-octyl-pentine-(1)-3,4-diol*

Using the same procedure as described in Example 1, 3-n-octyl-pentine-(1)-3,4-diol of the formula

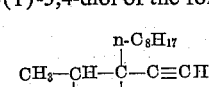

having a boiling point of 106° C. at 0.05 mm./Hg was prepared from 2-hydroxy-3-undecanone and acetylene.

*Example 9.—Preparation of 3-cyclohexyl-pentine-(1)-3,4-diol*

Using the same procedure as described in Example 1, 3-cyclohexyl-pentine-(1)-3,4-diol of the formula

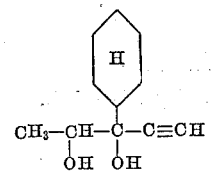

having a melting point of 111.5–113° C. was prepared from 1-cyclohexyl-2-hydroxy-1-propanone and acetylene.

The product was obtained as a crystalline residue.

*Example 10.—Preparation of 3-p-chlorophenyl-pentine-(1)-3,4-diol*

Using the same procedure as described in Example 1, 3-p-chlorophenyl-pentine-(1)-3,4-diol of the formula

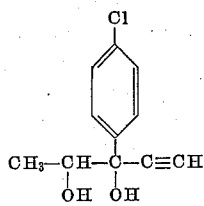

having a boiling point of 105–107° C. was prepared from 1-p-chlorophenyl-2-hydroxy-1-propanone and acetylene.

*Example 11.—Preparation of 3-phenyl-pentine-(1)-3,4-diol*

11.5 gm. (0.5 mol) of sodium were introduced into 450 cc. of liquid ammonia. The sodium went into solution and the solution turned blue. At the same time acetylene was passed through the solution until it turned colorless. Thereafter, 200 cc. of toluene (anhydrous) were added, and after removal of the cooling bath, the mixture was vigorously stirred until the ammonia had quantitatively evaporated. The residual suspension was admixed dropwise with a solution of 30 gm. of α-hydroxy propiophenone (0.2 mol) in 100 cc. of toluene, while simultaneously continuing to pass a gentle stream of acetylene therethrough. Subsequently, the resulting mixture was stirred for eight hours on a water bath at a temperature of 60–100° C. After the mixture had cooled, small pieces of ice were added accompanied by cooling, and the mixture was then neutralized with dilute hydrochloric acid (dilution ratio 1:1). After separation of the toluene phase, the aqueous phase was shaken with ether. Thereafter the organic phases were combined, dried over magnesium sulfate, and the solvent was distilled off in vacuo. The residue was fractionally distilled in vacuo.

3-phenyl-pentine-(1)-3,4-diol (Formula I, $R_1=C_6H_5$, $R_2=H$, $R_3=CH_3$)

was obtained.

B.P. at 0.04 mm./Hg: 84–87° C.

*Example 12.—Preparation of 3-n-propyl-pentine-(1)-3,4-diol*

A solution of ethyl magnesium bromide in tetrahydrofuran was prepared from 54.5 gm. (0.5 mol) of ethyl bromide, 12 gm. of magnesium shavings and 250 cc. of tetrahydrofuran (anhydrous). Accompanied by stirring, acetylene was passed through the solution in an atmosphere of nitrogen; the solution foamed slightly because of the liberation of ethane. While continuing to pass acetylene through the solution, a solution of 23.2 gm. (0.2 mol) of 2-hydroxy-3-hexanone in 50 cc. of tetrahydrofuran was added slowly at 0° C., taking care that an excess of acetylene was always present. Nitrogen was introduced simultaneously until the reaction had gone to completion. The reaction mixture was then decomposed with ammonium chloride, accompanied by cooling, the organic phase was separated and the aqueous phase was shaken several times with ether. Thereafter, the organic phases were combined, dried over magnesium sulfate, the solvent was distilled off and the residue was fractionally distilled in vacuo.

3-n-propyl-(1)-3,4-diol (Formula I,
$R_1 = -CH_2-CH_2-CH_3$
$R_2 = H$, $R_3 = CH_3$) was obtained.
B.P. at 0.05 mm./Hg: 55–57° C.

*Example 13.—Preparation of 3-methyl-4-phenyl-butine-(1)-3,4-diol*

Following the same order of steps as in Example 12, 1-phenyl-1-hydroxy-2-propanone was reacted with acetylene. After final removal of the solvent, 3-methyl-4-phenyl-butine-(1)-3,4-diol of the formula

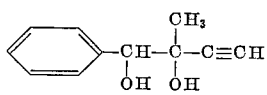

was obtained as a solid crystalline residue which was purified by customary recrystallization steps. The product had a melting point of 62–65° C.

*Example 14.—Preparation of 3-methyl-4-p-chlorophenyl-butine-(1)-3,4-diol*

Following the same order of steps as in Example 12, 1-p-chlorophenyl-1-hydroxy-2-propanone was reacted with acetylene. After final removal of the solvent, 3-methyl-4-p-chlorophenyl-butine-(1)-3,4-diol of the formula

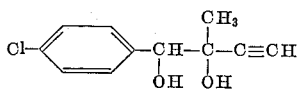

was obtained as a solid crystalline residue which was purified by customary recrystallization steps. The product has a melting point of 74–76° C.

*Example 15.—Preparation of 1-bromo-3-n-propyl-pentine-(1)-3,4-diol*

180 gm. of potassium hydroxide were dissolved in 800 cc. of water, the resulting solution was cooled to 0° C., 25 cc. of bromine were slowly added, and the resulting mixture was shaken for thirty minutes with 38.9 gm. of 3-n-propyl-pentine-(1)-3,4-diol. The organic phase was shaken several times with ether, the ethereal extract solution was washed twice with 25 cc. portions of 2 N sulfuric acid and twice with a saturated aqueous sodium chloride solution, dried over magnesium sulfate, and the ether was distilled off in vacuo. The residue, 1-bromo-3-n-propyl-pentine - (1) - 3,4 - diol (Formula I, $R_1 = -CH_2-CH_2-CH_3$, $R_2 = Br$, $R_3 = CH_3$), weighing 59 gm., was fractionally distilled in vacuo.
B.P. at 0.04 mm./Hg: 83–84° C. (36 gm.).

*Example 16.—Preparation of 1-bromo-3-phenyl-pentine-(1)-3,4-diol*

3-phenyl-pentine-(1)-3,4-diol was treated with an aqueous solution of potassium hypobromite according to the process of Example 15 and 1-bromo-3-phenyl-pentine-(1)-3,4-diol of the formula

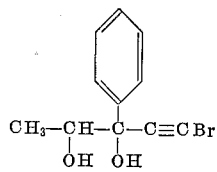

was obtained as a crystalline solid which was purified by recrystallization and had a melting point of 70–73° C.

*Example 17.—Preparation of 1-bromo-3-methyl-pentine-(1)-3,4-diol*

3-methyl-pentine-(1)-3,4-diol was treated with an aqueous solution of potassium hypobromite according to the process of Example 15 and 1-bromo-3-methyl-pentine-(1)-3,4-diol of the formula

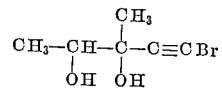

was obtained as a crystalline solid which was purified by recrystallization and had a melting point of 93–96° C.

*Example 18.—Preparation of 1-bromo-3-ethyl-pentine-(1)-3,4-diol*

Following the same procedure as in Example 15, 3-ethyl-pentine-(1)-3,4-diol was reacted with an aqueous solution of potassium hypobromite and 1-bromo-3-ethyl-pentine-(1)-3,4-diol of the formula

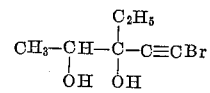

was recovered having a boiling point of 72–73.5° C. at 0.002 mm./Hg.

*Example 19.—Preparation of 1-bromo-3-n-propyl-pentine-(1)-3,4-diol*

Following the same procedure as in Example 15, 3-n-propyl-pentine-(1)-3,4-diol was reacted with an aqueous solution of potassium hypobromite and 1-bromo-3-n-propyl-pentine-(1)-3,4-diol of the formula

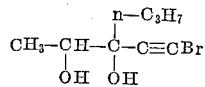

was recovered having a boiling point of 95.5° C. at 0.01 mm./Hg.

*Example 20.—Preparation of 1-bromo-3-isopropyl-pentine-(1)-3,4-diol*

3-isopropyl-pentine-(1)-3,4-diol was treated with an aqueous solution of potassium hypobromite according to the process of Example 15 and 1-bromo-3-isopropyl-pentine-(1)-3,4-diol of the formula

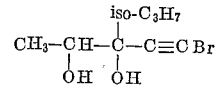

was obtained as a crystalline solid which was purified by recrystallization and had a melting point of 80–83° C.

*Example 21.—Preparation of 1-bromo-3-n-hexyl-pentine-(1)-3,4-diol*

3-n-hexyl-pentine-(1)-3,4-diol was treated with an aqueous solution of potassium hypobromite according to the process of Example 15 and 1-bromo-3-n-hexyl-pentine-(1)-3,4-diol of the formula

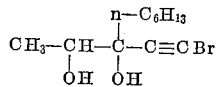

was obtained as a crystalline solid which was purified by recrystallization and had a melting point of 81–85° C.

*Example 22.—Preparation of 1-bromo-3-cyclohexyl-pentine-(1)-3,4-diol*

Following the same procedure as in Example 15, 3-cyclo-hexyl-pentine-(1)-3,4-diol was reacted with an aqueous solution of potassium hypobromite and 1-bromo-3-cyclohexyl-pentine-(1)-3,4-diol of the formula

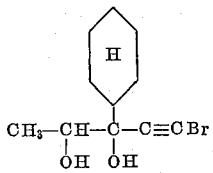

was recovered having a boiling point of 114.5–115° C. at 0.05 mm./Hg.

*Example 23.—Preparation of 1-bromo-3-methyl-4-phenyl-butine-(1)-3,4-diol*

3-methyl-4-phenyl-butine-(1)-3,4-diol was treated with an aqueous solution of potassium hypobromite according to the process of Example 15 and 1-bromo-3-methyl-4-phenyl-butine-(1)-3,4-diol of the formula

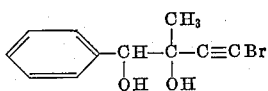

was obtained as a crystalline solid which was purified by recrystallization and had a melting point of 77–78° C.

Among the various alkine diols of Formulas I and Ia we have found that certain of them, as indicated in the examples, are obtained as crystalline solids. These particular compounds, in addition to being devoid or practically devoid of the rather unpleasant aromatic, burnt taste of the prior art compounds having two tertiary carbinol groups, are obtained in crystalline form rather than as oily liquids. In view of the fact that all the prior art alkine diols and many of the alkine diols of the invention having one secondary and one tertiary carbinol group are found in an oily, liquid form, this crystalline state was totally unexpected.

The properties of these crystalline alkine diols makes it possible to substantially improve their purification by crystallization, to improve the tests for purity of the product, to improve packaging and storage and to improve weighing and dosing since they can be incorporated into powders and tablets.

Particularly useful in this connection are 3-methyl-4-phenyl - butine - (1) - 3,4 - diol (I, $R_1=CH_3$, $R_2=H$, $R_3=C_6H_5$); 1 - bromo - 3 - methyl-4-phenyl-butine-(1)-3,4-diol (I, $R_1=CH_3$; $R_2=Br$; $R_3=C_6H_5$); 3-methyl-4-p-chlorophenyl-butine-(1)-3,4-diol (I, $R_1=CH_3$, $R_2=H$, $R_3=Cl$—$C_6H_5$; and 1-bromo-3-isopropyl-pentine-(1)-3,4-diol (I, $R_1=CH(CH_3)_2$, $R_2=Br$, $R_3=CH_3$).

For therapeutic applications the alkine diols of the invention are administered in single doses of from 30 to 700 mg., preferably 100 to 500 mg., in admixture with customary inert fillers in the form of tablets, coated pills, syrups, capsules, etc. The compounds of the invention may also be administered in combination with other sedative or therapeutic agents.

The following are illustrative examples of various pharmaceutical compositions containing the alkine diols of the invention. The parts are parts by weight.

*Tablets of 500 mg.*

| Composition: | Parts |
|---|---|
| 3-methyl-4-phenyl-butine-(1)-3,4-diol | 500 |
| Corn starch | 130 |
| Finely dispersed silicic acid | 7 |
| Soluble starch | 20 |
| Magnesium stearate | 3 |
| | 660 |

*Preparation.*—500 parts of the active ingredient are thoroughly admixed with 40 parts of the corn starch and with
80 parts of a 25% starch solution and, if necessary, moistened with a small amount of water. The ingredients are thoroughly kneaded, forced through a screen of 1.5 mm.-mesh, and dried at 45° C. After drying, the granulate is again passed through a 1.5 mm.-mesh screen.
560 parts of the granulate are admixed with
90 parts of corn starch,
7 parts of finely dispersed silicic acid, and
3 parts of magnesium stearate.

The mixture is pressed into tablets having a diameter of 13 mm. and a weight of 660 mg.

*Tablets of 150 mg.*

| Composition: | Parts |
|---|---|
| 3-methyl-4-phenyl-butine-(1)-3,4-diol | 150 |
| Lactose | 340 |
| Corn starch | 200 |
| Soluble starch | 25 |
| Finely dispersed silicic acid | 7 |
| Magnesium stearate | 3 |
| | 725 |

*Preparation.*—150 parts of the active ingredient are thoroughly admixed with 340 parts of lactose and
95 parts of the corn starch, and the mixture is moistened with
100 parts of a 25% starch solution and, if necessary, with a small amount of water, thoroughly kneaded, passed through a 1.5 mm.-mesh screen, and dried at 45° C. Thereafter, the granulate is again passed through a 1.5 mm.-mesh screen.
610 parts of the granulate are admixed with
105 parts of corn starch,
7 parts of finely dispersed silicic acid and
3 parts of magnesium stearate.

The mixture is pressed into flat tablets with a diameter of 13 mm. and a weight of 725 mg.

*Wafer capsule of 300 mg.*

| Composition for 1 capsule: | Parts |
|---|---|
| 3-methyl-4-phenyl-butine-(1)-3,4-diol | 300 |
| Lactose, powdered | 100 |
| Corn starch | 100 |
| | 500 |

*Preparation.*—The 3 - methyl-4-phenyl-butine-(1)-3,4-diol, the lactose and the corn starch are thoroughly admixed with each other and the mixture is granulated with 110 cc. of water by passing the moistened mass through a screen with a 0.7 mm.-mesh. The granulate is dried at 30° C. and 500 mg. portions of the dry granulate are filled into wafer capsules, size 1 (diameter 20 mm.).

*Tablets of 150 mg.*

| Composition: | Parts |
|---|---|
| 1 - bromo - 3 - methyl-4-phenyl-butine-(1)-3,4-diol | 150 |
| Lactose | 340 |
| Corn starch | 200 |
| Soluble starch | 25 |
| Finely dispersed silicic acid | 7 |
| Magnesium stearate | 3 |
| | 725 |

*Preparation.*—150 parts of the active ingredients are thoroughly admixed with 340 parts of the lactose and
95 parts of the corn starch, and the mixture is moistened with
100 parts of a 25% starch solution and, if necessary, with a small amount of water, thoroughly kneaded, forced through a 1.5 mm.-mesh screen and dried at 45° C. Thereafter, the granulate is again passed through a 1.5 mm.-mesh screen.
610 parts of this granulate are admixed with
105 parts of corn starch,
7 parts of finely dispersed silicic acid and
3 parts of magnesium stearate.

The mixture is pressed into flat tablets with a diameter of 13 mm. and a weight of 725 mg.

*Wafer capsules of 150 mg.*

Composition for 1 capsule:

|  | Mg. |
|---|---|
| 1-bromo-3-methyl-4-phenyl-butine-(1)-3,4-diol | 150 |
| Lactose, powdered | 250 |
| Corn starch | 100 |
|  | 500 |

*Preparation.*—The 1-bromo-3-methyl-4-phenyl-butine-(1)-3,4-diol, the lactose and the corn starch were thoroughly admixed with each other and the mixture was granulated with 100 cc. of water by passing the moist mixture through a 0.75 mm.-mesh screen. 500 mg. portions of this granulate, which had been dried at 30° C., are filled into wafer capsules, size 1 (diameter 20 mm.).

The alkine diols of the invention are useful sedatives as stated previously. The hypnotic and narcotic effects have been tested on various animals and the lethal dose ($LD_{50}$) has also been determined.

The alkine diol was emulsified with 20% by weight of gum arabic and was tested in mice per os. The criterion for hypnotic effect was the occurrence of disturbances in ambulation and ataxia. A narcotic effect was assumed when the animals remained in the supine position. The median hypnotic, narcotic and lethal doses were calculated by the method of Litchfield and Wilcoxon.

A summary of the hypnotic ($HD_{50}$), narcotic ($ND_{50}$) and lethal doses ($LD_{50}$) for some of the alkine diols of Formulas I and I$a$ is as follows:

| Example | R₁ | R₂ | R₃ | HD₅₀ | ND₅₀ | LD₅₀ | M.P. |
|---|---|---|---|---|---|---|---|
| 13 | CH₃ | H | C₆H₅ | 210 | 410 | 710 | 62–65° |
| 23 | CH₃ | Br | C₆H₅ | 55 | 320 | 650 | 77–78° |
| 1 | C₆H₅ | H | CH₃ | 240 | 445 | 1,000 | (liquid) |
| 4 and 12 | n-C₃H₇ | H | CH₃ | 220 | 520 | 1,190 | (liquid) |
| 6 | n-C₄H₉ | H | CH₃ | 255 | 435 | 1,600 | (liquid) |
| 14 | CH₃ | H | p-Cl–C₆H₄ | 135 | 520 | 740 | 74–76° |
| 15 | n-C₃H₇ | Br | CH₃ | 238 | 580 | 1,080 | (liquid) |
| 20 | iso-C₃H₇ | Br | CH₃ | 150 | 550 | 1,550 | 80–83° |

Among the alkine diols we have found most preferable 3-methyl-4-phenyl-butine-(1)-3,4-diol and its 1-bromo analog.

3-METHYL-4-PHENYL-BUTINE-(1)-3,4-DIOL

This substance is a solid crystalline product, which is practically odorless and is soluble in water to an extent of 7 or 8% by weight. As shown in the summary, this compound has the following hypnotic ($HD_{50}$), narcotic ($ND_{50}$) and lethal doses ($LD_{50}$) when tested with mice per os.

$HD_{50}=210$ mg./kg.
$ND_{50}=410$ mg./kg.
$LD_{50}=710$ mg./kg.

In contrast to the barbiturates, 3-methyl-4-phenyl-butine-(1)-3,4-diol does not exhibit any excitation symptoms during the beginning and subsiding phases of the hypnotic or narcotic effects. The animals did not tremble and during the narcotic stage they could not be awakened even by strong external stimulations.

The narcotic effect can also be demonstrated with small doses by the prolongation of the Evipan-sleep. When the animals are given 100 mg./kg. of Evipan-sodium intraperitoneally and at the same time 50 mg./kg. of 3-methyl-4-phenyl-butine-(1)-3,4-diol, the period of sleep increases by 25 to 30 minutes. After administration of 100 mg./kg. of 3-methyl-4-phenyl-butine-(1)-3,4-diol the increase in the period of sleep amounts to 120 to 140 minutes.

In analogous fashion, the hypnotic and narcotic effect in rats was determined. The results were:

$HD_{50}=350$ mg./kg. (graphically determined)
$ND_{50}=620$ mg./kg. (graphically determined)
$LD_{50}=1085$ mg./kg. (calculation according to Karber)

Sedation is also achieved in dogs and cats by administration of 3-methyl-4-phenyl-butine-(1)-3,4-diol per os; in some of these animals a very deep sleep is also induced from which they are not easily awakened.

3-methyl-4-phenyl-butine-(1)-3,4-diol is useful as a tranquilizing and deep-sleep-inducing agent by peroral administration.

4-BROMO-3-METHYL-4-PHENYL-BUTINE-(1)-3,4-DIOL

This substance is a solid, is tasteless on the tongue and is soluble in water to a minor extent. The sedative effects of this compound are very distinct; in test animals sleep is induced without passage through an excitation or trembling stage. Upon peroral testing on white mice, the following values were obtained for the hypnotic ($HD_{50}$), narcotic ($ND_{50}$) and lethal doses ($LD_{50}$):

$HD_{50}=55$ mg./kg.
$ND_{50}=320$ mg./kg.
$LD_{50}=650$ mg./kg.

While we have illustrated the present invention by various embodiments, it is readily apparent to those skilled in the art that our invention is not limited to those particular embodiments, and that various changes and modifications may be made without departing from the spirit of the invention and the scope of the appended claims.

We claim:
1. An alkine diol of a formula selected from the group consisting of

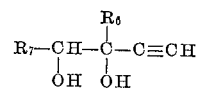

and

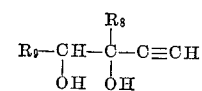

wherein $R_6$ is selected from the group consisting of phenyl and halophenyl,
$R_7$ is methyl,
$R_8$ is a radical of 1 to 8 carbon atoms selected from the group consisting of alkyl and cyclohexyl, and $R_9$ is a radical of 1 to 6 carbon atoms selected from the group consisting of methyl, phenyl and halophenyl.
2. 3-methyl-4-phenyl-butine-(1)-3,4-diol.
3. 3-phenyl-pentine-(1)-3,4-diol.
4. 3-n-propyl-pentine-(1)-3,4-diol.
5. 3-n-butyl-pentine-(1)-3,4-diol.
6. 3-methyl-4-p-chlorophenyl-butine-(1)-3,4-diol.

References Cited by the Examiner

UNITED STATES PATENTS

| | | | |
|---|---|---|---|
| 1,841,768 | 1/1932 | Straus et al. | 260—617 |
| 2,806,067 | 9/1957 | Monroe | 260—617 |
| 2,955,139 | 10/1960 | Hofer et al. | 260—617 |
| 2,955,140 | 10/1960 | Hofer et al. | 260—617 |
| 2,956,083 | 11/1960 | Feit | 260—618 |
| 2,987,438 | 6/1961 | Ashkenaz | 167—52 |
| 2,992,278 | 7/1961 | Tedeschi | 260—617 |
| 2,996,427 | 8/1961 | Robson | 167—52 |

FOREIGN PATENTS

| | | |
|---|---|---|
| 1,273,880 | 9/1961 | France. |
| 365,372 | 12/1962 | Switzerland. |

OTHER REFERENCES

Mills et al.: "Soc. for Expl. Biol, and Med., Proc," vol. 96, October-December 1957, pp. 100–2.

Venus et al.: "Chem. Abstracts," vol. 47 (1953), p. 8683.

Perveev: "Chem. Abstracts," vol. 50 (1956), p. 7053.

Bernard et al.: "Chem. Abstracts," vol. 40 (1946), pp. 834–5.

Venus et al.: "Zhur. Obshchei, Khim.," vol. 28 (1958), No. 6, pp. 1477–82.

Nikitin et al.: "Chem. Abstracts," vol. 55 (1961), p. 22112.

Favorski et al.: "Chem. Abstracts," vol. 37 (1943) p. 3735.

LEON ZITVER, *Primary Examiner.*

FRANK S. CACCIAPAGLIA, JR., *Examiner.*

P. L. SABATINE, J. E. EVANS, *Assistant Examiners.*